United States Patent
Steele

(10) Patent No.: US 6,371,409 B1
(45) Date of Patent: Apr. 16, 2002

(54) AT LEAST PARTIALLY BOUYANT VEHICLE WITH MOVABLE SOLAR PANEL ASSEMBLIES

(75) Inventor: Roger H. Steele, Littlerock, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/667,839

(22) Filed: Sep. 22, 2000

(51) Int. Cl.[7] .................................................. B64B 1/00
(52) U.S. Cl. .......................................... 244/30; 136/292
(58) Field of Search ............................ 244/1 R, 24, 30, 244/31, 173; 136/243, 244, 245, 292, 706

(56) References Cited

U.S. PATENT DOCUMENTS

| | | | |
|---|---|---|---|
| 3,817,477 A | | 6/1974 | Luther et al. |
| 3,863,870 A | * | 2/1975 | Andrews et al. |
| 4,265,418 A | | 5/1981 | Eymard |
| 4,364,532 A | * | 12/1982 | Stark |
| 4,534,525 A | | 8/1985 | Bliamptis |
| 4,591,112 A | | 5/1986 | Piasecki et al. |
| 4,636,579 A | * | 1/1987 | Hanak et al. |
| 4,799,629 A | | 1/1989 | Mori |
| 5,348,254 A | * | 9/1994 | Nakada |
| 5,433,259 A | * | 7/1995 | Faludy |
| 5,515,898 A | * | 5/1996 | Alcocer |

\* cited by examiner

Primary Examiner—Charles T. Jordan
Assistant Examiner—T. Dinh
(74) Attorney, Agent, or Firm—Robert A. Schruhl

(57) ABSTRACT

The invention is at least a partially buoyant vehicle. In detail, the vehicle includes a gas-containing structure having an outer contoured surface. At least one solar panel assembly is mounted to the outer surface of gas-containing structure, the solar panel movable over a portion of the surface of gas-containing structure. A drive system is provided for moving the at least one solar panel assembly over the outer surface of the gas-containing structure. A track assembly mounted on the surface of the gas-containing structure for guiding the at least one solar panel assembly over the surface. Preferably the at least one solar panel assembly in the form of a flexible strip having first and second ends movable along the surface about the longitudinal axis of the vehicle.

4 Claims, 2 Drawing Sheets

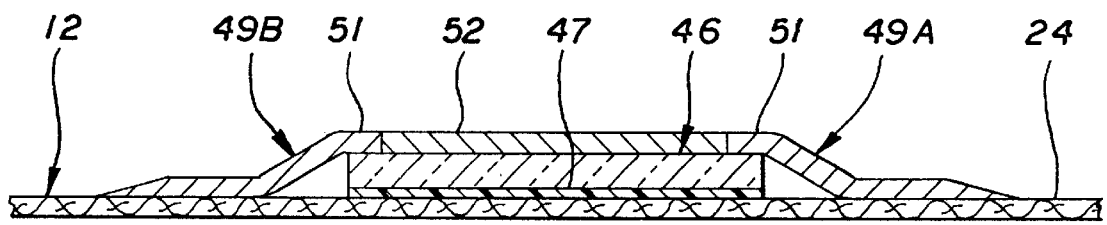
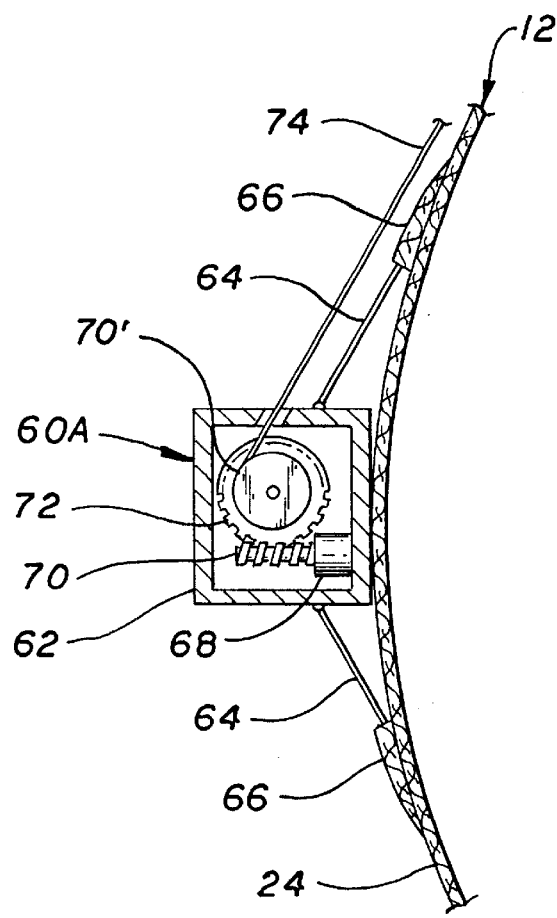
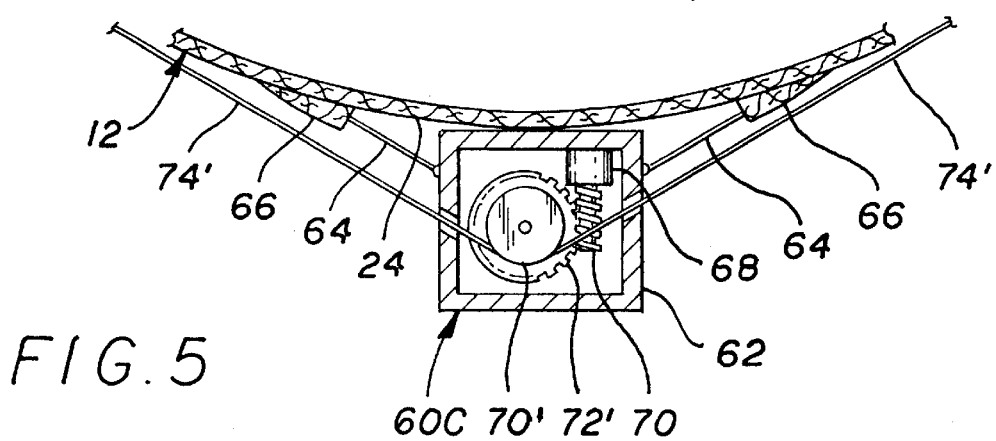

AT LEAST PARTIALLY BOUYANT VEHICLE WITH MOVABLE SOLAR PANEL ASSEMBLIES

BACKGROUND OF THE INVENTION

1. Field of the Invention

The invention relates to the field of lighter-than-air and/or simi-buoyant vehicles and, in particular, to vehicles having solar panels for generating electrical power.

2. Description of Related Art

There are basically two main types of fully lighter-than-air vehicles; the ridged type or as it is more commonly called the "dirigible" and the non-ridged type or "blimp". Blimps basically comprise a single or multi-number of non-ridged gas bags wherein internal inflation pressure is used to form the external shape of the vehicle. A typical example of this design is found in U.S. Pat. No. 4,265,418 "Elongated Inflatable Structures For Flying Device Bodies" by M. Eymard. The other basic type of lighter-than-air vehicle is-the ridged design wherein an internal support structure is covered with a flexible material that serves as the outer skin. The vehicle may consist of a single gas chamber wherein the outer skin serves as the "gas bag" or can have numerous internal gas bags. An example of this concept can be found in U.S. Pat. No. 4,591,112 "Vectored Thrust Airship" by F. N. Piasecki, et al.

These two examples are true lighter-than-air vehicles in that the gas filled balloon generates all the lift. However, having the external contour of the vehicle in an aerodynamic lift producing shape can reduce the overall size of such vehicles and generally cost, for any given payload. Such aircraft are not totally buoyant and take off in a manner similar to a conventional aircraft. In such designs, it is common practice to use a ridged internal frame (the dirigible concept) in order to maintain the proper contour. For example U.S. Pat. No. 3,486,719 "Airship" by J. R., Fitzpatick, Jr. While the Fitzpatick, Jr. design uses a ridged skin; most use a flexible gas bag with an internal frame structure. Of course there are non-ridged designs such as disclosed in U.S. Pat. No. 2,778,585 "Dynamic Lift Airship" by D. B. Tschudy. D. B. Tschudy's design includes a multi-lobe gas bag with a general aerodynamic shape.

High altitude long-duration solar powered airships have been proposed for both commercial and military applications. For example, station keeping lighter-than-air vehicles have been proposed for cellular telephone applications. Military applications also include telecommunication applications as well as intelligence gathering. In most such applications, long duration station keeping is essential. Thus electrical energy generated using solar arrays or photovoltaic cells to power the vehicle has been considered. U.S. Pat. No. 4,534,525 "Evacuated Balloon For Solar Collection" by E. E. Bliamptis disclosed a blimp concept wherein solar energy is collected through a transparent portion of the of the structure and reflected from internally positioned shaped surfaces to the to solar collectors. Such a design requires transparent material, which may not be structurally efficient. It may also have undesirable thermal effects on the lifting gas. It also limits the orientation of the vehicle. Another example can be found in U.S. Pat. No. 4,788,629 "Flying Object For Collecting Solar Rays" by K. Mori. Here the vehicle is disc shaped and maintains its position by a propulsion system. Solar energy is collected by a solar collecting device and guided through an optical conductor into the interior of the vehicle. Again, as in the previous example, maintaining optimum position in relationship to the sun can be difficult and limits orientation of the vehicle.

Most all spacecraft are solar powered. In such vehicles, as well as on the ground, the solar panels are rotatable so that an optimum angle can be maintained between the solar panels and the sun. An example can be found in U.S. Pat. No. 3,817,477 "Deployable Annular Solar Array: by E. M Luther, et al. Far more common is to just mount the solar panels on large rotatable booms. However, these systems are not particularly advantages for use on a lighter-than-air type vehicle. Several experimental propeller driven aircraft have been flown incorporating solar panels on the wings, including long endurance high altitude aircraft Thus, it is a primary object of the invention to provide an at least partially buoyant vehicle that is at least partially powered by solar power.

It is another primary object of the invention to provide an at least partially buoyant vehicle that is at least partially powered by solar power wherein the solar panels can be adjusted to maximize the absorption of sunlight.

It is a further object of the invention to provide an at least partially buoyant vehicle that is at least partially powered by solar power wherein the solar panels can be adjusted to maximize the absorption of sunlight and which does not compromise the flying qualities of the vehicle or the performance of the payload, or mission equipment.

It is a still further object of the invention to provide an at least partially buoyant vehicle that is at least partially powered by solar power and minimizes the amount of photo-voltaic cells required.

SUMMARY OF THE INVENTION

The invention is at least a partially buoyant vehicle that is solar powered. In detail, the vehicle includes a gas-containing structure having an outer contoured surface. At least one solar panel assembly is mounted to the outer surface of gas-containing structure, the solar panel movable over a portion of the surface of gas-containing structure. A drive system is provided for moving the at least one solar panel assembly over the outer surface of the gas-containing structure. A track assembly is mounted on the surface of the gas-containing structure for guiding the at least one solar panel assembly over the surface. Preferably, the at least one solar panel assembly in the form of a flexible strip having first and second ends is movable along the surface about the longitudinal axis of the vehicle.

Preferably, the drive system to move the at least one solar panel assembly over the surface of the gas-containing structure includes first and second motors mounted on the surface of the gas-containing structure on each side thereof. The first and second motors drive reels incorporating cables attached to each end of the at least one solar panel assembly. Thus when the motors are actuated, the at least one solar panel assembly can be moved over the surface of the gas containing structure so that the position of the at least one solar panel assembly is always optimally position in relation to the sun maximizing power generation. Alternately, a single motor with a reel mounted on the surface of the vehicle could be used with a cable wrapped about the reel with the ends coupled to each end of the solar panel.

To aid in the movement of the at least one solar panel assembly and to insure that the at least one solar panel assembly remains in position on the surface of the gas bag, a plurality of guide assemblies are mounted on the surface of the gas-containing structure. In addition, a friction reducing surface is applied to the gas-containing structure along its path of the at least one solar panel assembly, to reduce frictional forces. Of course, the friction reducing material could be applied to the underside of the solar panel, or to both surfaces.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a cross-sectional view of FIG. 2 taken along the line 3—3

FIG. 4 is a cross-sectional view of the drive system having two drive motors with reels used to move the solar panels.

FIG. 5 is a cross-sectional view of an alternate drive system using a single motor and reel for moving the solar panels.

DESCRIPTION OF THE PREFERRED EMBODIMENT

Figure 1:
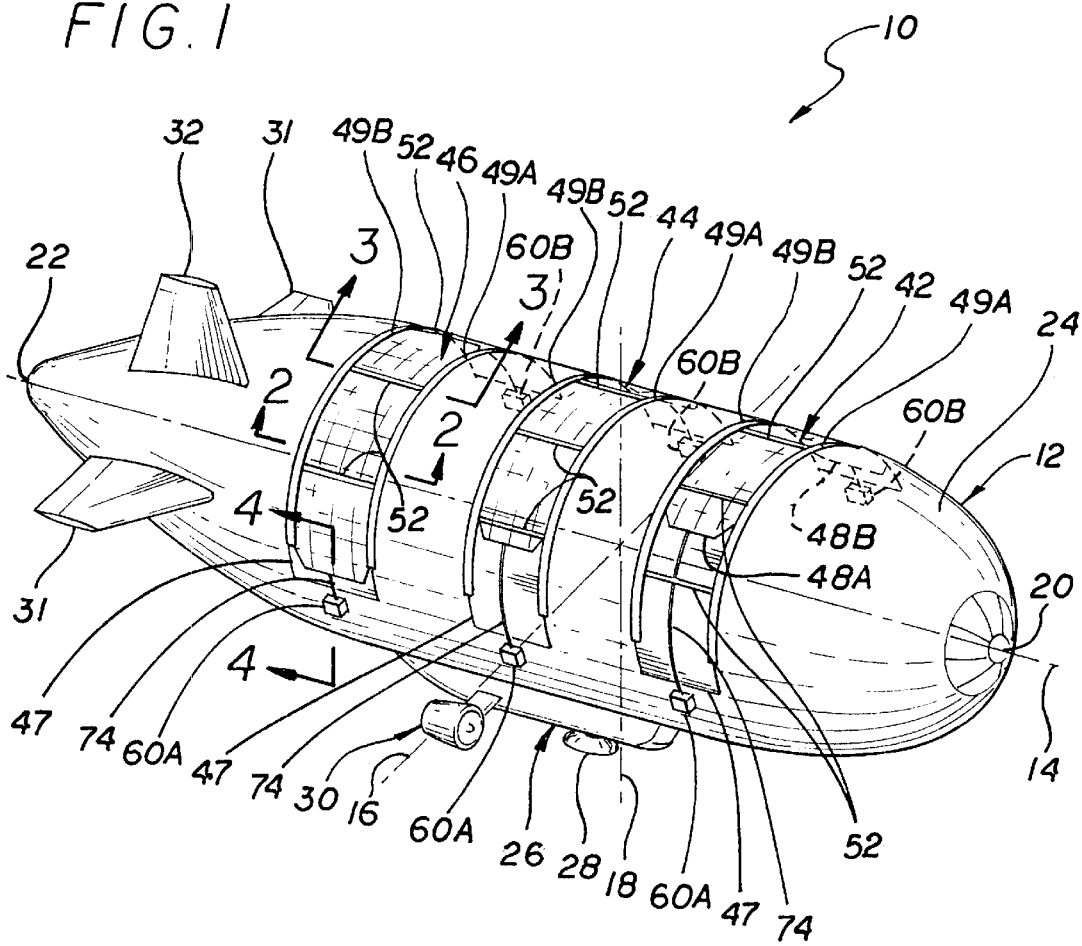
FIG. 1 is a perspective view of a lighter-than-air vehicle

Illustrated in FIG. 1 is a perspective of a lighter-than-air vehicle, generally designated by numeral 10, designed for high altitude long duration missions. The vehicle 10 includes an inflatable gas bag 12 having longitudinal axis 14, horizontal axis 16 and vertical axis 18 with nose 20, tail 22, and an external surface 24. A gondola 26 is suspended from the bottom of the gas bag 12, which includes communication antenna 28, and rotatable ducted fan type propulsion systems 30. Of course, a propeller type propulsion system would also be appropriate. In addition, the tail 22 includes horizontal and vertical stabilizers 31 and 32, respectively. The vehicle 10 was selected for purposes of illustration only. It could well be a semi-buoyant vehicle designed with a gas bag having an aerodynamic shape for producing lift. It could also have a ridged internal support structure; all of which are considered to be gas containing structures.

Figure 2:
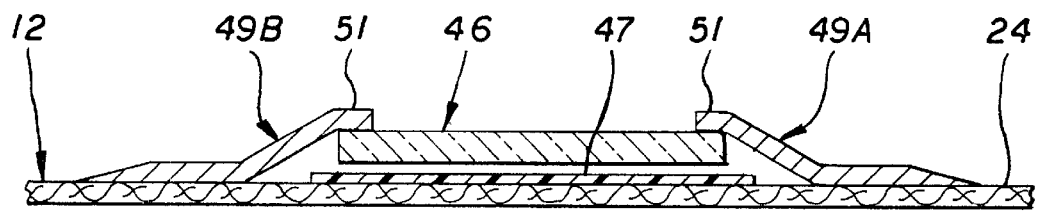
FIG. 2 is a cross-sectional view of the light-than-air vehicle illustrated in Figure taken along the line 2—2.

Still referring to FIG. 1 and additionally to FIG. 2–3, the vehicle 10 includes a solar panel system 40 comprising a plurality of solar panel assemblies 42, 44 and 46 having ends 48A and 48B. While three solar panel are illustrated, there could be as few as one photo-voltaic cell and with the maximum number depending on the size and mission of the vehicle. Each solar panel assemblies 42–46 is shown in a different position to illustrate some of the various locations that the solar panel assemblies can be placed in, depending upon the position of the sun and the direction the vehicle 10 is moving. In reality, depending upon the position of the sun, all three solar panels 42–46 would be in the same location. Each solar panel assembly 42–46 includes a flexible solar panel movably mounted on a flexible strip of low friction material 47 bonded to the surface 24 of the vehicle as shown in FIG. 1. Alternately, the material 47 could be bonded to the solar panel assemblies 42–46 as shown in FIGS. 2 and 3. A suitable low friction material can be made of TEFLON,® manufactured by the E. I. duPont de Nemours & Company, Wilmington, Del. When the strip of material 47 is bonded to the surface 24 of the vehicle 10, it is longer than the solar panel assemblies 42–46 so as to accommodate their movement of the solar panel assemblies.

For and aft aerodynamic guide and retention members 49A and 49B are bonded on the surface 24 of the gas bag 12 at the sides of the solar panels 42–46. These retention members 49A and 49B arms 51 that extend up and over the sides of the solar panel assemblies 42–46 and act as guides therefore. Located along the path solar panel assemblies 42–46 is cable additional retention members 52 that are joined at each end to the retention members 49A and 49B. It should be noted that while both retention members 49A and 49B and retention members 52 are used either might be used alone, if design requirements allow.

Mounted in line with the solar panels 44–46 on either side of the gas bag 12 are drive units 60A and 60B. Each drive unit 60A and 60B includes a housing 62 mounted on surface 24 of the gas bag 12. Any number of conventional means may accomplish attachment of the drive units 60A and 60B to the gas bag 12. As illustrated, the housing 62 is attached to the surface 24 by means of cables 64 connected to patches 66 bonded to the surface 24. The devices 60A and 60B include a motor 68 having a worm gear 70 that engages a cable reel 70 having a gear 72 in engagement with the worm gear. The reel contains a cable 74 joined to the ends 48A and 48B of the solar panel assemblies 42–46. Thus upon actuation of the motors 68 the solar panel assemblies 42–46 can be pulled from one side while released from the opposite side. By keeping a net tension load on the cables 74 and the use of the retention members 49A and 49B and retention members 52, the solar panels 42–44 are held against the surface 24.

Referring to FIG. 5, it is possible to use a single drive unit, designated by 60C, if the real 70' is designed to handle to allow the cable 74' to wrap there around. As illustrated the cable 74' wraps around the reel 70' so that sufficient frictional resistance is generated to prevent slipping. All the other elements of the drive unit 60C remain identical to drive units 60A and 60B. An ideal location would be on the vertical axis 18 at the bottom of the gas bag 12.

Thus it can be seen that the solar panels can be adjusted for changes in direction or if maintained in a stationary position, for the time of day and year and the inclination of the sun throughout the year at various latitudes about the earth. It is by far simpler and less costly than any of the prior art system previously described. Furthermore, it can provide very precise positioning to maximize the collection of solar energy and to minimize the cost and weight thereof.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

Industrial Applicability

The invention has applicability to semi lighter-than-air vehicle and lighter-than-air vehicle manufacturers.

What is claimed is:

1. An at least partially buoyant vehicle, said vehicle includes a longitudinal, vehicle and horizontal axis and an upper and lower surface, said vehicle comprising:

a gas-containing structure having and outer contoured surface, at least one flexible solar panel assembly in the form of a strip having first and second ends movable along the upper surface about the longitudinal axis, a track assembly mounted on said surface of said gas-containing structure for guiding said at least one solar panel assembly over said surface, means to move said at least one solar panel assembly over said upper surface of said gas-containing structure comprises a motor mounted on said surface of said gas-containing structure, said motor having a reel incorporating a cable wrapped about said reel with said cable connected to said first and second ends of said at least one solar panel assembly, such that upon said motor being actuated, it rotates said reel pulling said solar panel assembly from one of said first and second ends and releasing said other end, moving said polar panel assembly over said surface of said vehicle.

2. The vehicle of claim 1 wherein said means to move said at least one solar panel assembly over said upper surface of said gas-containing structure comprises first and second motors mounted on said surface of said gas-containing structure on each side thereof, said first and second motors having first and second reels, respectively, incorporating first and second cables, said cables attached to each end of said at least one solar panel assembly, such that when said motors are actuated they rotate said reels pulling said solar panel assembly over the surface about said longitudinal axis of said vehicle.

3. The vehicle as set forth in claims 1 and 2, comprising a plurality of guide assemblies mounted on said surface of said gas-containing structure for guiding said at least one solar panel assembly along said surface of said gas-containing structure.

4. The vehicle as set forth in claim 3 comprising a low friction producing surface mounted on said surface of said gas-containing structure along the path of movement of said at least one solar panel assembly.

* * * * *